M. T. Boult,
Wood-Carving.

No. 91,410. Patented Jun. 15. 1869.

Witnesses:

Inventor:
Myron T. Boult
per Alexander & Mason
Attys.

UNITED STATES PATENT OFFICE.

MYRON T. BOULT, OF BATTLE CREEK, MICHIGAN.

IMPROVEMENT IN MACHINES FOR CARVING AND ORNAMENTING WOOD-WORK.

Specification forming part of Letters Patent No. 91,410, dated June 15, 1869.

*To all whom it may concern:*

Be it known that I, MYRON T. BOULT, of Battle Creek, in the county of Calhoun, and in the State of Michigan, have invented certain new and useful Improvements in Machine for Cutting Panels and Grooves; and do hereby declare that the following is a full, clear, and exact description thereof, reference being had to the accompanying drawings, and to the letters of reference marked thereon.

The nature of my invention consists in the construction of a machine with one or more curved or angular knives or cutters, secured to a cutter-head or mandrel for the purpose, and having the facility of penetrating wood, and also for cutting laterally or across the surface in any desired direction, according to forms of patterns placed upon the opposite or back side of the stuff to be cut, which is moved upon or around a guide point or roller, the center of which corresponds with the center of motion of cutter.

In order to enable others skilled in the art to which my invention appertains to make and use the same, I will now proceed to describe its construction and operation, referring to the annexed drawings, which form a part of this specification, and in which—

Figure 1:
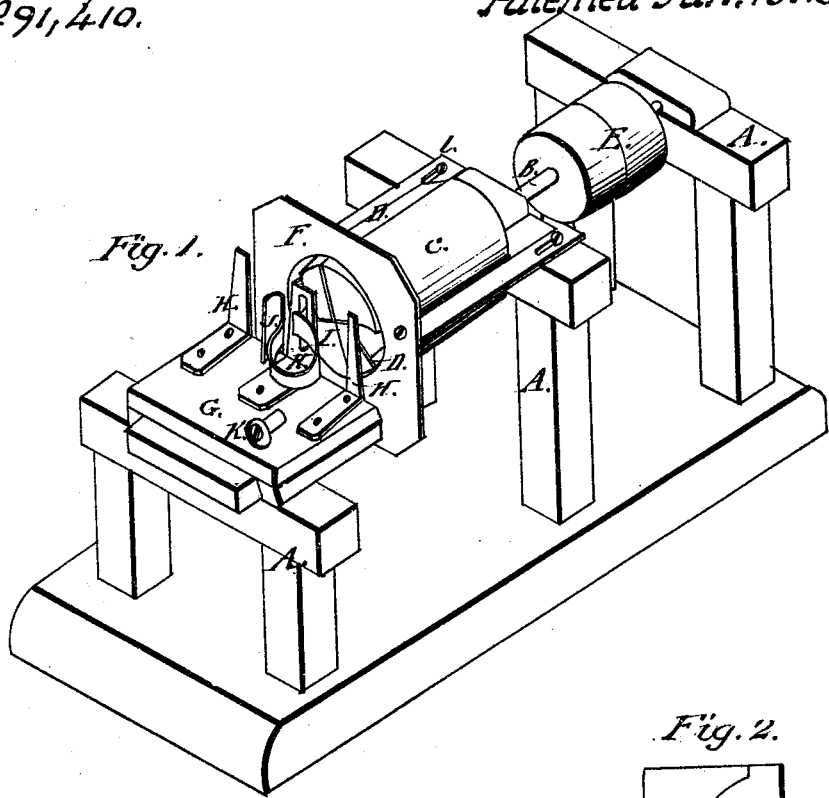
Figure 2:
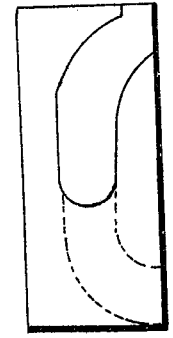

Figure 1 is a perspective of the machine, and Fig. 2 shows a piece of wood partly cut.

A represents the frame, upon which is placed the mandrel B, having attached to the outer end the cutter-head C, to which are fastened the curved or angular cutters or knives D D, the mandrel being driven by a belt running on the pulley E.

The gage-plate F, or its equivalent, is adjustable, and governs the depth of cut by a form for variable cutting, or by being fastened by set-screws $b$ $b$, for cutting uniform depth.

The adjustable table G, with its arms H H, spring J, and guide-point I, is controlled by set-screw K, so as to be adjustable to different thicknesses of material, and to allow the cutter C to be entered at any part of the stuff to be worked, and to allow the cutter to be withdrawn when the work is done; also, for entering and withdrawing the guide-point I from an open or slotted pattern, so as to work concentrically, at all times maintaining its position in line with center of cutter.

What I claim as my invention, and desire to secure by Letters Patent, is—

The arrangement of the cutter-head C with one or more angular or curved cutters, D, adjustable gage-plate F, and adjustable table G, with its arms H H H, roller I, and spring J, or their equivalents, all constructed substantially as shown and described.

In testimony that I claim the foregoing I have hereunto set my hand this 16th day of November, 1868.

MYRON T. BOULT.

Witnesses:
P. H. EMERSON,
M. E. SMITH.